United States Patent [19]

Masaka

[11] 4,306,842
[45] Dec. 22, 1981

[54] ELECTROMAGNETIC PUMPS

[75] Inventor: Mitusuke Masaka, Kawagoe, Japan

[73] Assignee: Jidosha Kiki Co., Ltd., Japan

[21] Appl. No.: 47,617

[22] Filed: Jun. 11, 1979

[30] Foreign Application Priority Data

| Jun. 28, 1978 | [JP] | Japan | 53/77400 |
| Jul. 7, 1978 | [JP] | Japan | 53/92888[U] |
| Jul. 7, 1978 | [JP] | Japan | 53/92889[U] |
| Jul. 12, 1978 | [JP] | Japan | 53/94979[U] |
| Jul. 13, 1978 | [JP] | Japan | 53/95671[U] |

[51] Int. Cl.³ .............................................. F04B 17/04
[52] U.S. Cl. ................................................. 417/417
[58] Field of Search ....................... 417/417, 415, 416; 310/30

[56] References Cited

U.S. PATENT DOCUMENTS

| 2,994,792 | 8/1961 | Parker | 417/417 |
| 3,400,663 | 9/1968 | Wertheimer | 417/417 |
| 3,512,902 | 5/1970 | Emmons | 417/416 |
| 3,543,061 | 11/1970 | Wallace | 417/416 |
| 4,047,852 | 9/1977 | O'Connor | 417/417 |
| 4,169,696 | 10/1979 | Brown | 417/417 |

FOREIGN PATENT DOCUMENTS

52-36964  8/1977  Japan .................................. 417/417

Primary Examiner—William I. Freeh
Assistant Examiner—Edward Look
Attorney, Agent, or Firm—Townsend and Townsend

[57] ABSTRACT

A U shaped yoke member and a U shaped housing member are combined to define a closed space. A sleeve containing a plunger, an exciting coil wound about the sleeve, an oscillator for passing pulsating current through the exciting coil, a return spring, an inlet valve, an outlet valve, are contained in the space. The opposite ends of the sleeve extend through openings of a pair of spaced parallel legs of the yoke and are secured to the legs by inlet and outlet fixtures connected to the openings.

7 Claims, 15 Drawing Figures

ELECTROMAGNETIC PUMPS

BACKGROUND OF THE INVENTION

This invention relates to an electromagnetic pump of the type for feeding fuel to an internal combustion engine of a motor car, for example.

The electromagnetic pump of this type is required to have a simple construction, the capability of being machined and assembled accurately with low labor content and the capability of stable operation. Prior art electromagnetic pumps can not fulfill all of these requirements.

For example, an electromagnetic pump disclosed in U.S. Pat. No. 3,400,663 comprises a nonmagnetic sleeve containing a plunger, an inlet fixture and an outlet fixture secured to the opposite ends of the plunger, and a U shaped yoke acting as a frame, the opposing legs of the yoke being provided with aligned openings for mounting the inlet and outlet fixtures respectively in a coaxial relationship. The yoke is prepared by bending a relatively thick magnetic plate of iron or steel and functions to form a flux path for reciprocating the plunger when an exciting coil wound about the sleeve is energized. After assembly with various components parts, the yoke is fitted into a housing constructed to close the opening of the yoke, thus forming a portion of a container for the electromagnetic pump.

In such prior art electromagnetic pump, since the yoke is formed by bending a relatively thick plate, not only is the bending operation troublesome but also there is a fear that the bent legs will not extend exactly in the horizontal direction, or the legs may deflect, thus making it impossible to form parallel legs. With such a deformed yoke, it is difficult to coaxially arrange the openings for securing the fixtures. Coaxially misaligned inlet and outlet fixtures will deform the sleeve, thus preventing accurate movement of the plunger and hence the stable operation of the pump.

When bending a plate to form the yoke the accuracy of bending should be high so as to precisely combine the yoke with the housing. It is also necessary to avoid the formation of any gap between the yoke and the component parts disposed between the opposing legs of the yoke.

When the openings are formed independently through respective legs it is difficult to maintain the openings in correct coaxial relation. To attempt to avoid this problem, these openings have been formed by advancing a drill from one side through both legs of a U shaped yoke. This method can improved the coaxial relationship but since both legs are separated, one of the legs is typically bent inwardly by the drill, thus impairing the coaxial arrangement.

When a U shaped yoke is used as above described, a high working accuracy is required for various component elements thus complicating the working and assembling operations with the result that the cost of manufacturing is increased.

Further, in the prior art electromagnetic pump, a bobbin for winding an exciting coil is fitted about the sleeve between the opposing legs of the yoke, and a printed substrate supporting electronic elements which comprise an oscillator for supplying pulsating current to the exciting coil is mounted on the outer ends of the legs of the yoke. Thus, the plunger is reciprocated in the sleeve by an electromagnetic force produced by the exciting coil and a return spring so as to feed liquid from an inlet passage of the inlet fixture to an outlet passage of the outlet fixture.

In most of the electromagnetic pumps of this type, the housing is also formed by bending a magnetic plate made of iron or steel so that when the printed substrate mounted on the outer ends of the legs of the yoke comes in contact with the inner surface of the housing a short circuiting path is formed. Accordingly, it is necessary to positively secure the printed substrate to the yoke to prevent disengagement of the substrate from the yoke legs due to shocks and vibrations. For this purpose, it is necessary to precisely construct various component parts so as to assure a proper gap between the inner surface of the housing and the printed substrate or to apply an insulating paper to the printed substrate.

SUMMARY OF THE INVENTION

Accordingly, it is a principal object of this invention to provide an improved electromagnetic pump capable of highly stable operation.

Another object of this invention is to provide an electromagnetic pump which is less expensive than the prior art electromagnetic pump and can be assembled readily.

Still another object of this invention is to provide an electromagnetic pump in which various component parts are not required to be machined accurately as in the prior art construction yet can provide the desired operating performance.

Yet another object of this invention is to provide an electromagnetic pump in which the construction of a yoke disposed on the opposite ends of a sleeve containing a plunger is simplified thus facilitating the assembly of the yoke, and inlet and outlet fixtures.

A further object of this invention is to provide an improved electromagnetic pump in which electrical components of the pump are well insulated and shielded from outside or other component parts.

Still further object of this invention is to provide an electromagnetic pump wherein a printed substrate incorporated with electronic elements of an oscillator is securely fixed to a yoke against vibrations and shocks.

According to this invention there is provided an electromagnetic pump of the type comprising a non-magnetic sleeve, a plunger slidably contained in the sleeve, an inlet fixture and an outlet fixture which are disposed on the opposite ends of the sleeve, an exciting coil surrounding a portion of the sleeve between the inlet and outlet fixtures, means for passing pulsating current through the exciting coil for reciprocating the plunger and a return spring acting on the plunger thereby pumping liquid by the reciprocating motion of the plunger, characterized by a generally U shaped yoke member comprising a pair of spaced parallel legs and a connecting plate for interconnecting one end of the pair of legs, a generally U shaped housing member combined with the yoke member so as to define a closed space adapted to contain principal elements of the electromagnetic pump, and means for fastening together the combined yoke member and the housing member, the pair of legs being provided with openings for securing the inlet fixture and the outlet fixture.

DESCRIPTION OF THE PREFERRED EMBODIMENTS

Figure 1:
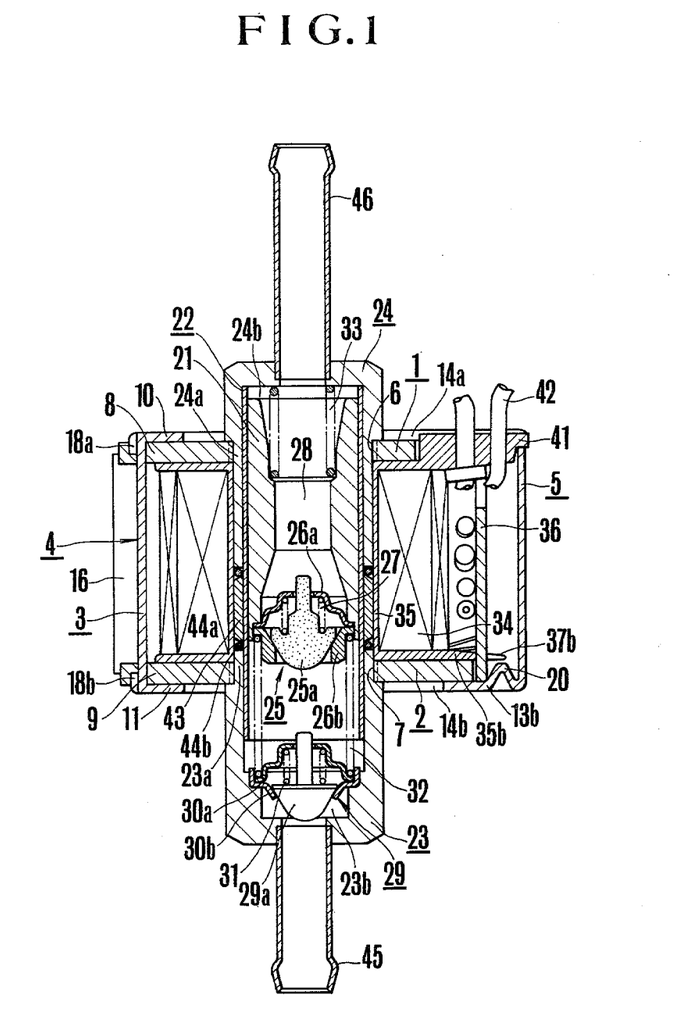
FIG. 1 is a longitudinal sectional view showing one embodiment of the electromagnetic pump according to this invention.
Figure 2:
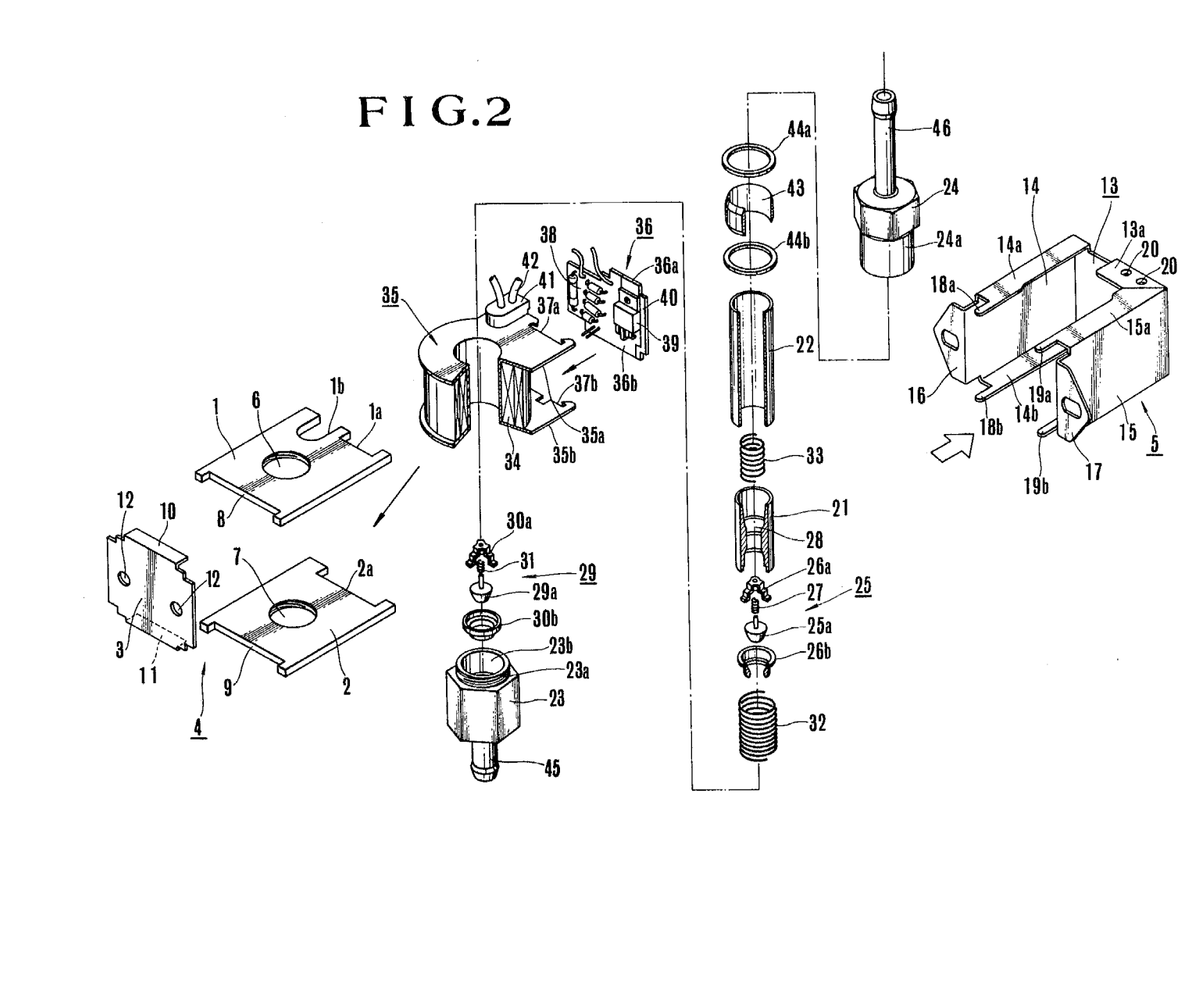
FIG. 2 is an exploded view, partly in section, showing various component parts of the electromagnetic pump shown in FIG. 1.
Figures 3, 4:
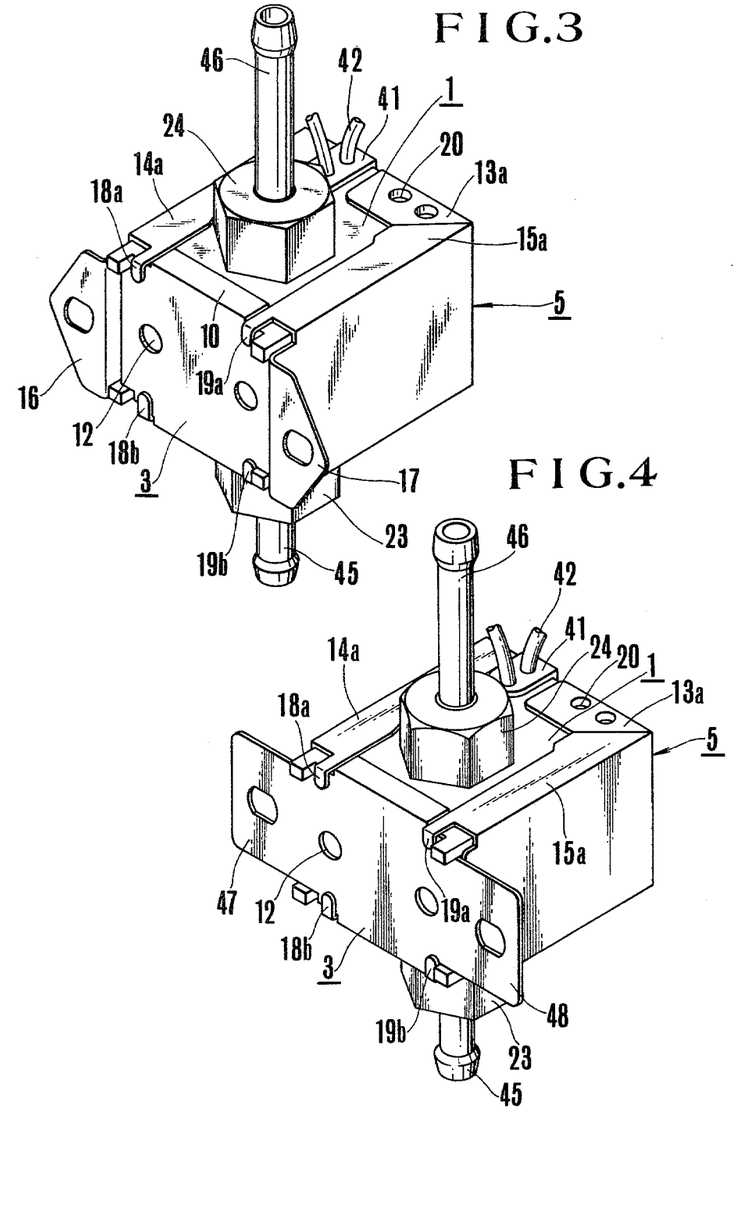
FIG. 3 is a general perspective view of the electromagnetic pump shown in FIG. 1.
FIGS. 4 and 5 are perspective views showing modified connecting plates of the yoke.

A preferred embodiment of the electromagnetic pump embodying the invention shown in FIGS. 1, 2 and 3 comprises a generally U shaped yoke member 4 having spaced parallel legs 1 and 2 and a connecting plate 3 engaging one end of the legs, and a housing member 5 which is bent into a U shape to cover the opening of the yoke member 5. The yoke member and the housing member are combined to form a space for accommodating principal mechanical and electrical component parts of the pump.

Three plates 1, 2 and 3 constituting the yoke member 4 are made of magnetic materials such as steel or iron. When these plates are combined they form a flux path for reciprocating a plunger to be described later and plate shaped legs 1 and 2 constitute a supporting frame for supporting various component parts of the pump.

Legs 1 and 2 are in the form of rectangular plates having a relatively large thickness and provided with circular openings 6 and 7 of the same diameter at their centers.

These openings 6 and 7 oppose each other and are utilized to receive an inlet fixture 23 and an outlet fixture 24 respectively, and their inner peripheries are cut with screw threads. One edge of the legs 1 and 2 are notched to form engaging portions 8 and 9 for receiving the connecting plate 3. The edge of the leg 1 opposite the engaging portions is formed with a shallow U shaped notch 1a and a deep U shaped notch 1b, and the corresponding edge of the second leg 2 is provided with a shallow U shaped notch 2a.

As shown in FIG. 2 the dimension of the connecting plate 3 is determined by the width and spacing of the legs 1 and 2 and has thinner thicknesses than the legs 1 and 2. The upper and lower edges of the connecting plate 3 which face the engaging portions 8 and 9 are provided with bent pieces 10 and 11 which engage legs 1 and 2 respectively for interconnecting them. Both ends of the upper and lower edges of plate 3 are stepped. The connecting plate 3 functions as a lid for the space defined by the legs 1, and 2 and the connecting plate 3, and is provided with two openings 12 at the central portion. As will be described later in connection with a modified embodiment, these openings 12 are used to inject foamable polyurethane into the space for electrically insulating electrical component parts received in the space. In contrast to the legs 1 and 2 which constitute the supporting frame, since the connecting plate is used to form a portion of the flux path together with the legs 1 and 2, its thickness may be determined to any desired value.

As shown in FIG. 2 the housing member 5 is bent into a generally U shape so that when it is combined with the yoke member 4 it closes the opening thereof. More particularly, the housing member 5 comprises a bottom plate 13 and a pair of side plates 14 and 15. The outer ends of the side plates 14 and 15 are respectively bent outwardly to form flanges 16 and 17 for securing the electromagnetic pump to a car body, for example. Both side edges of the side plates 14 and 15 are bent inwardly to form opposing edges 14a, 14b, 15a and 15b. The upper and lower ends of the bottom plate 13 are also provided with bent edges 13a and 13b. These edges 13a, 14a, 15a, 13b, 14b and 15b are in the same plane to cover the periphery of the opening of the housing member 5, and function both as guide members for the legs 1 and 2 of the yoke member when they are inserted into the housing member 5 and also serve to clamp the yoke member. For this latter purpose, projections 18a, 18b, 19a and 19b are formed on the inner ends of the bent edges 14a, 14b, 15a and 15b. When these projections are bent against the outer surface of the connecting plate 3 (as illustrated in FIG. 3), the yoke member 4 is fixed in the housing member 5. The edges 13a and 13b of the bottom plate 13 are provided with inwardly extending projections 20 (see FIG. 2) at a small distance from the inner surface of the bottom plate 13. These projections are used to support a printed substrate of an oscillator supported by the yoke member 4 such that the substrate does not contact the inner surface of the bottom plate 13 when it is contained in the housing. The upper edge 13a of the bottom plate 13 is notched at a portion corresponding to the deep U shaped notch 1b of the leg 1.

As shown in FIGS. 1 and 2, principal component elements of the pump are contained in the space defined by the yoke 4 and the housing member 5. More particularly, a nonmagnetic sleeve 22 extends through the openings 6 and 7 of the legs 1 and 2 and the opposite ends of the sleeve are secured to the legs 1 and 2 by an inlet fixture 23 and an outlet fixture 24 threaded into openings 6 and 7, respectively, thereby holding the sleeve 22 by the cylindrical portions 23a and 24a of the fixtures 23 and 24. A valve member 25a acting as a discharge valve 25 is provided beneath a plunger 21 contained in the sleeve 22, the valve member 25a being supported by holders 26a and 26b and normally urged to close a bore 28 in the plunger 21 by a spring 27. Also a valve member 29a acting as a suction valve 29 is contained in the cylindrical portion 23a of the inlet fixture 23, the valve member 29a being supported by holders 30a and 30b and urged to close the inlet passage in the inlet fixture 23 by a spring 31. A return spring 32 is disposed in the sleeve 22 at a portion beneath the plunger 21 for normally biasing the plunger toward the inlet fixture 24. A spring 33 is provided to absorb the shock applied to the outlet fixture 24 caused by the plunger 21.

A bobbin 35 carrying an exciting coil 34 is disposed about the sleeve 22 in a space between the legs 1 and 2, and flanges 35a and 35b of the bobbin 35 project along legs 1 and 2 respectively. The inner ends of these flanges are formed with notches 37a and 37b to mount an oscillator 36 which is used to supply pulsating current to the exciting coil 34. The oscillator 36 comprises a printed substrate supporting such electric circuit elements as resistors and diodes and printed with electrically conductive paths on the back, and a heat dissipating metal plate 40 on which a transistor 39 is mounted, as shown in FIG. 2. The mounting pieces 36a and 36b at the upper and lower edges are held by the notches 37a and 37b of the bobbin 35 and the outer ends of the holding pieces are inserted in the notches 1a and 2a of the plate shaped legs 1 and 2 of the yoke.

When the housing member 5 is combined with the legs 1 and 2 as above described, the metal plate 40 engages at least one of the projections 20 provided by the housing member 5 to transmit heat generated by the transistor 39 to housing member 5, thus dissipating the heat to the outside. Where the electromagnetic pump contains a transistor as above described, it is not necessary to provide an opening for the base plate 13 of the housing member 5 for passing wires interconnecting the transistor and the printed substrate, thus preventing invasion of dust into the pump.

The bobbin 35 has an integral boss 41 which projects through the notch 1b of the leg 1 and a notch of the housing member 5 corresponding thereto. Lead wires 42 from the printed substrate 38 extend through the boss 41.

A non-magnetic ring 43 and a pair of rubber rings 44a and 44b are fitted into a gap between the outer surface of sleeve 22 and the inner surface of the central opening of the bobbin 35 for preventing leakage of liquid through the connections between the sleeve and the fittings 23 and 24. The inlet and outlet fixtures 23 and 24 are provided with pipes 45 and 46 for connecting the inlet passage 23b and the outlet passage 24b of respective fixtures 23 and 24 to the usual associated elements.

The electromagnetic pump of this invention can be readily assembed in the following manner. The bobbin 35 of the exciting coil, the oscillator 36, etc. are clamped between the legs 1 and 2 of the yoke 4, and the sleeve 22 containing plunger 21 etc. is passed through the openings 6 and 7 of the legs 1 and 2. Thereafter, the inlet fixture 23 and the outlet fixture 24 are secured to the legs 1 and 2 from the opposite ends of the sleeve 22. Then the bent pieces 10 and 11 of the connecting plate 3 are received in the engaging members 8 and 9 of the legs 1 and 2 supporting the principal elements described above. After inserting the assembly in the housing member 5, projections 18a, 18b, 19a and 19b of the housing member 5 are bent against the outer surface of the connecting plate 3 to securely interconnect the housing member and the yoke member, thus completing the electromagnetic pump assembly as shown in FIG. 3.

The printed substrate 38 supporting electronic elements comprising the oscillator 36 and the metal plate 40 supporting the transistor 39, which are incorporated into the yoke member 4, are held by the projections 20 of the housing member 5. Thus, the substrate 38 and the metal plate 40 are secured to the legs 1 and 2 and then contained in the housing member 5 to confront the inner surface of the base plate 13 with a predetermined separation distance, thus preventing the printed substrate 38 from contacting the inner surface of the base plate 13 to eliminate the possibility of causing a short circuit.

In the electromagnetic pump thus assembled, since the inlet fixture 23 and the outlet fixture 24 adapted to support the opposite ends of the sleeve 22 are secured to the openings 6 and 7 of independent legs 1 and 2 of the yoke, even when the positions of these openings offset slightly, the sleeve 22 will not be deformed as in the prior art construction and the legs 1 and 2 are maintained in parallel spaced relationship thus ensuring that the sleeve 22 and fixtures 23 and 24 are coaxially arranged. Relative displacement between legs 1 and 2 can be corrected when they are inserted in the housing member 5. By first assembling the legs 1 and 2 and the connecting plate 3, and then inserting this assembly into the housing member 5, the principal components of the pump and the yoke member 4 are contained in the housing member 5 with the sleeve 22 and the fixtures 23 and 24 in correct coaxial relationship. Thus, the plunger 21 can be reciprocated in the sleeve 22 by the electromagnetic force created by the exciting coil 34, excited by the pulsating current generated by the oscillator 36, and the return spring 32 to provide stable pump action.

In contrast to the prior art construction wherein aligned openings are formed through opposing legs of a U shaped yoke, in the electromagnetic pump of this invention, as it is necessary to form opposed openings through plate shaped legs of the yoke, the machining of the openings can be simplified. Moreover, it is not necessary to precisely bend a relatively thick iron plate into a U shaped configuration as in the prior art. According to this invention, the yoke can be fabricated by merely punching or stamping out three plates, thus simplifying this portion of the manufacturing operation. Moreover the component parts can be readily placed between the opposing legs 1 and 2.

Although in the foregoing description non-magnetic ring 43 and a pair of rubber rings 44a and 44b are disposed about the sleeve 22, discharge valve 25 is disposed beneath the plunger 21, and transistor 39, printed substrate 38 and oscillator 36 are contained in the pump the invention is not limited to this specific construction.

Further, it will be clear that the invention is not limited to a specific construction of the yoke and housing members in which the connecting plate 3 is provided with bent pieces 10 and 11 which engage the engaging portions of the legs 1 and 2. In addition, rather than providing bendable projections 18a, 18b, 19a and 19b on the housing member 5 for interconnecting the housing member and the yoke member, such bendable projections may be provided on the connecting plate 3.

Thus, according to this invention, the yoke 4 is assembled by using a pair of spaced parallel legs and a connecting plate to have a generally U shape, and the yoke 4 is contained in the housing member 5 constructed to close the opening of the yoke member.

Instead of providing projections 20 on the bent edges 13a and 13b of the bottom plate 13 of the housing member 5, these projections may be formed on the inner surfaces of the bottom plate 13 to extend inwardly for the purpose of separating the printed substrate from the base plate 13.

Figure 5:
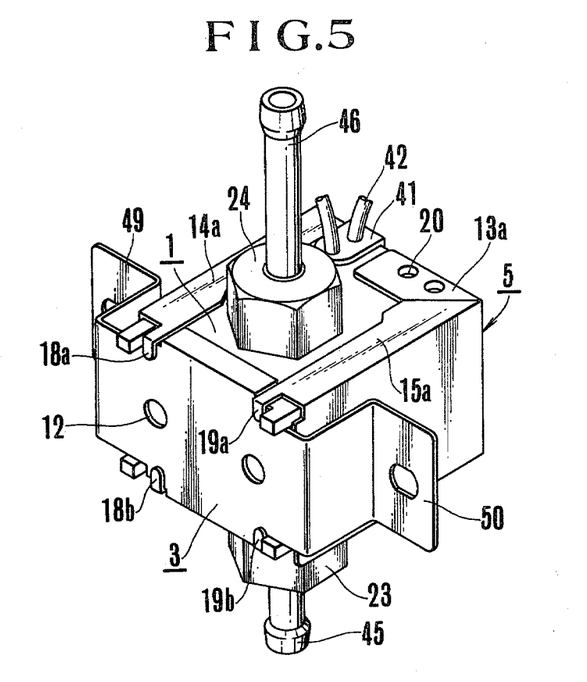

Instead of forming bent flanges 16 and 17 on the inner ends of the side plates 14 and 15 of the housing member 5 for mounting the electromagnetic pump, modifications as shown in FIGS. 4 and 5 are possible which utilize the fact that the yoke member 4 is made up of three plates 1, 2 and 3.

Thus, in the embodiment shown in FIG. 4 both sides of the connecting plate 3 project outwardly to provide flanges 47 and 48 for mounting the pump. This can be readily accomplished by increasing the width of the connecting plate 3. This construction is simpler than the embodiment of FIG. 3. Moreover, as the connecting plate may have a large thickness, it is possible to increase the strength of the mounting flanges by using the FIG. 4 arrangement.

In an alternative construction shown in FIG. 5, the connecting plate 3 is formed in a U shape with outwardly bent mounting flanges 49 and 50. With this construction, it is possible to secure the portion of the pump near the sleeve 22 to the car body, which is more efficient than securing one end the pump to the car body.

Mounting of the inlet and outlet fixtures 23, 24 by screw threads not only requires thread cutting operations but also requires machining the tops of these fixtures to have an hexagonal shape for permitting use of spanner or the like.

When assembling the electromagnetic pump described above, the bobbin wound with the exciting coil is fitted between the legs of the yoke 4, the sleeve 22 containing the plunger 21 is inserted through the openings of the opposed legs 1, 2 and the central opening of the coil 34 and then the inlet and outlet fixtures 23, 24 are secured to the openings 6, 7 of the legs 1, 2 for holding opposite ends of the sleeve. The fixtures 23, 24 are threaded in opposite directions so that it is necessary to take care to correctly position each fixture 23, 24 in the correct leg opening 6, 7.

Figure 6:
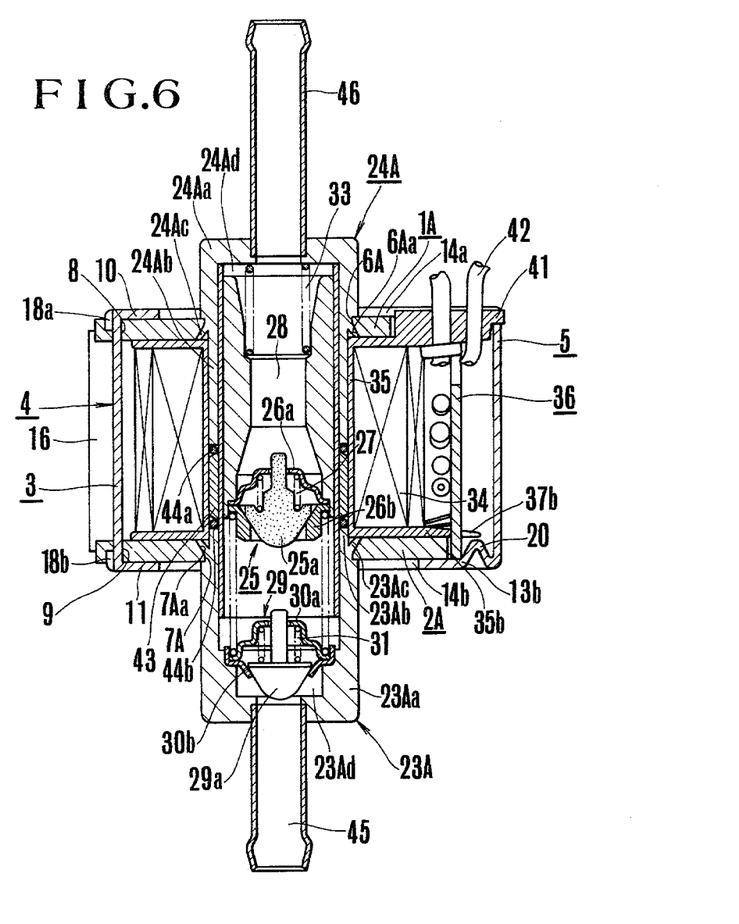
FIG. 6 is a longitudinal sectional view showing another embodiment of the electromagnetic pump.
Figure 7:
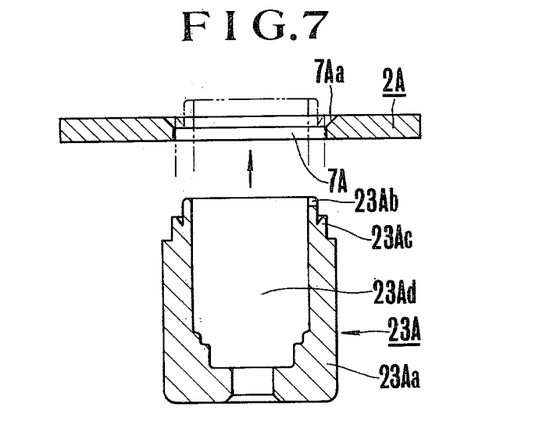
FIG. 7 is a sectional view showing the manner of securing a fixture to one plate shaped leg of the yoke.

FIG. 6 shows a modification of this invention which differs from the embodiment shown in FIGS. 1–3 in that inlet and outlet fixtures 23A and 24A for holding the opposite ends of the sleeve 22 containing the plunger 21 are secured to the openings 6A and 7A of the legs 1A and 2A of the yoke by caulking instead of screw threads. The inlet and outlet fixtures 23A and 20A have generally cylindrical heads 23A$a$ and 24A$a$ respectively, and cylindrical portions 23A$b$ and 24A$b$ having smaller diameters are connected to the openings of the heads to extend in the radial direction. Annular projections 23A$c$ and 24A$c$ having the same diameters as openings 6A and 7A are formed at the shoulders between the heads 23A$a$ and 24A$a$ and the cylindrical portions 23A$b$ and 24A$b$ to surround the base portions of the cylindrical portions 23A$b$ and 24A$b$. The outer ends of the annular projections 23A$c$ and 24A$c$ are bent outwardly against the inclined surfaces 6A$a$ and 7A$a$ of the openings 6A and 7A. Such caulkings can be made by inserting the inlet fixture 23A, for example, provided with the annular projection 23A$c$ into the opening 7A of the plate shaped leg 2A of the yoke to a position shown by phantom lines shown in FIG. 7 and then bending outwardly the annular projection 23A$c$ with a tool inserted between the gap between the annular projection 23A$c$ and the cylindrical portion 23A$b$. Accordingly, as shown in FIG. 6 the inlet and outlet fixtures 23A and 24A are secured to the openings 6A and 7A by the outwardly bent annular projections 23A$c$ and 24A$c$. This construction is designed such that the opening ends of the heads 23A$a$ and 24A$a$ will be contained in planes which intersect at right angles with the axes of respective fixtures 23A and 24A thereby fixing them with their axes maintained at right angles with respect to the yoke legs 1A and 2A. The inlet and outlet fixtures 23A and 24B are provided with an inlet passage 23A$d$ and an outlet passage 24A$d$ respectively for holding the opposite ends of the sleeve 22.

Like the embodiment shown in FIG. 1, component parts of the pump are disposed between the yoke legs 1A and 2A to which the inlet and outlet fixtures have been secured as above described. These component parts are designated by the same reference numerals as in FIG. 1.

The electromagnetic pump shown in FIG. 6 can be readily assembled in the following manner. The inlet and outlet fixtures 23A and 24A to which pipes 45 and 46 have been soldered are secured to the openings 6A and 7A of the legs 1A and 2A by caulkings formed in the manner described above. The suction valve 29 is disposed in the cylindrical portion 23A$b$ of the inlet fixture 23A and one end of the sleeve 22 containing the sleeve 22 is held by the inlet fixture 23A. Then the bobbin 35 carrying the exciting coil 34, oscillator 36, etc. is disposed about the sleeve 22. Then the yoke leg 2A is mounted from above to hold the other end of the sleeve 22 by the cylindrical portion 24A$b$ of the outlet fixture 24A. In this manner, the main component elements of the pump are contained in the space between the legs 1A and 2A. Then the bent pieces 10 and 11 of the connecting plate 3 are urged against the engaging portions 8 and 9 of the legs 1 and 2 and the assembly is contained in the housing member 5. Thereafter, the projections 18$a$, 18$b$, 19$a$ and 19$b$ of the housing member 5 are bent against the outer surface of the connecting plate 3 to interconnect the yoke member 4 and the housing member 5, thereby completing the electromagnetic pump shown in FIG. 6.

With this electromagnetic pump, the inlet and outlet fixtures 23A and 24A adapted to be secured to the yoke legs 1A and 2A are not required to be shaped with an hexagonal head or to be cut with screw threads on their peripheries. Thus they can be formed as simple cylindrical bodies. Further, the inlet and outlet fixtures 23A, 24A can be accurately secured to the legs 1A, 2A by forming the annular shoulders at the opening ends of their heads 23A$a$ and 24A$a$ to be in the planes orthogonal to the axis of the sleeve. This construction does not require the degree of machining accuracy for the construction shown in FIGS. 1, 2 and 3.

Furthermore, it is possible to secure the inlet and outlet fixtures 23A, 24A at correct positions of the legs 1A, 2A with a suitable jig. According to this modification, since the respective fixtures are preassembled to the legs, it is possible to decrease the number of component parts for final assembly.

It is to be understood that the invention is not limited to the specific construction shown in FIG. 6. Thus for example, the heads of the fixtures may have other shapes than cylindrical and one of the fixtures may be secured by threading instead of caulking. Also the annular projections 23A$c$ and 24A$c$ may be substituted by a plurality of projections at the opening ends of the fixtures which are bendable outwardly.

Figure 8:
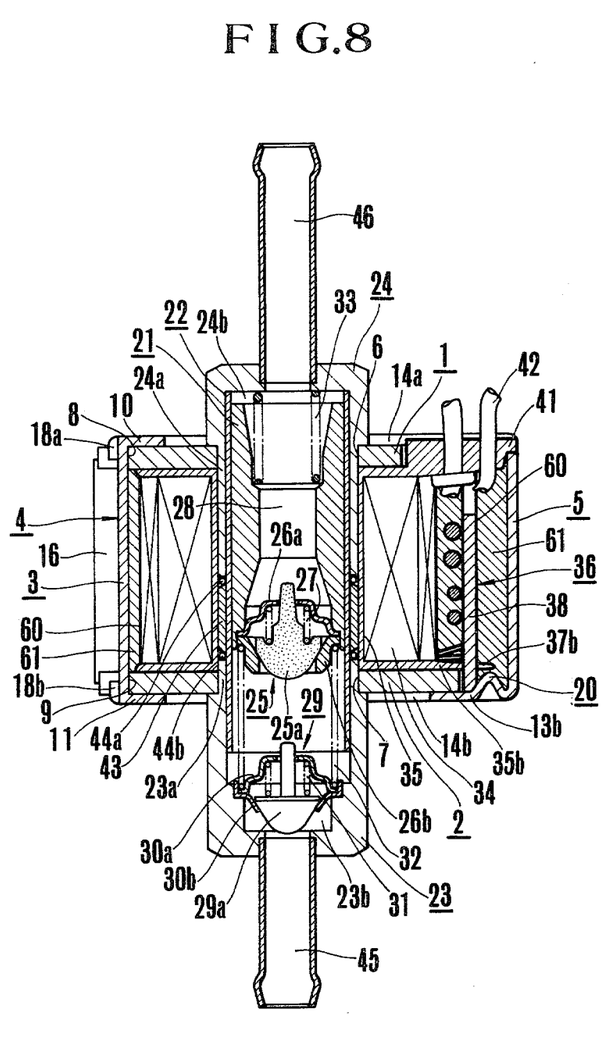
FIG. 8 is a longitudinal sectional view showing still another modification of this invention.
Figure 9:
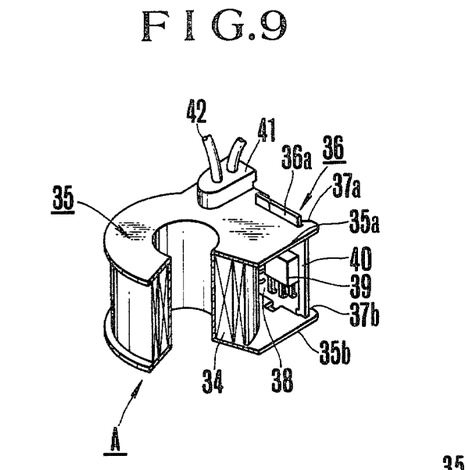
FIG. 9 is a perspective view, partly broken away, showing an oscillator assembly utilized in the embodiment shown in FIG. 8.

FIG. 8 illustrates still another modification of the electromagnetic pump in which elements corresponding to those shown in FIG. 1 are designated by the same reference characters. These modifications improve sealing of the pump. Thus, a printed substrate 38 carrying electronic elements and transistor 39 which constitute an oscillator 36 for supplying pulsating current to an exciting coil 34 contained in the space between the yoke member 4 and the housing member 5 is combined with a bobbin 35 to form an oscillator assembly A as shown in FIG. 9. This oscillator assembly A should be insulated well; accordingly, an insulating coating layer 60 is formed on the outer surface of the oscillator assembly A. Such insulating coating layer 60 can be formed by closing the central opening of the bobbin with an adhesive tape and then dipping the assembly in a silicone oil. Thus the oscillator assembly A is perfectly sealed by the insulating layer 60.

As shown in FIG. 8, the space between the oscillator assembly A and the yoke and housing members is filled and sealed with a polyurethane foam 61 introduced through the openings 12 (see FIG. 2). Thus, various component elements of the pump are completely surrounded by the polyurethane foam thus effectively preventing invasion of water or brine. Since two openings 12 are provided for the connecting plate 3, either one of them can be used for admitting foamable polyurethane, thus eliminating accurate positioning of the component elements, While one opening is being used to admit the foamable polyurethane the other opening is used to observe the amount of the admitted polyurethane.

Therefore, the oscillator assembly A is perfectly sealed by the insulating layer 60 and the polyurethane foam 61 so that it is preserved in an insulated state. According to the prior art construction, the transistor 39 was mounted on the outside of the pump, whereas according to this invention, the oscillator assembly including the transistor is contained within the pump housing in such a manner as to be protected against flying stones and water, mud or brine. Other types of foamed material can be substituted for the polyurethane foam.

Figure 10:
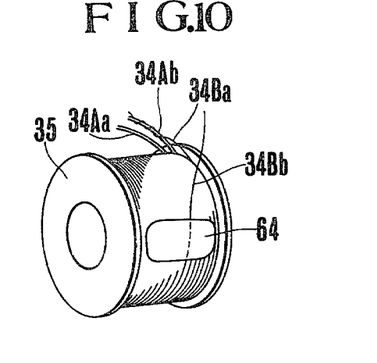
FIG. 10 is a perspective view showing the coil assembly of the electromagnetic pump.

FIGS. 10, 11, and 12A-12D show a modified exciting coil which is characterized in that the end of coil is fixed by a hot melt binder 64 as shown in FIG. 10. With this construction, it is not necessary to prevent loosening of the end turn of the exciting coil by wrapping an insulating tape as in the prior art construction.

Figure 11:
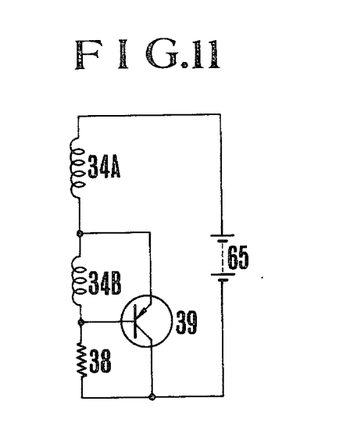
FIG. 11 shows an electric circuit utilized in the electromagnetic coil shown in FIG. 10 and FIGS. 12A–12D show successive steps of manufacturing the coil assembly shown in FIG. 10.
Figure 12A:
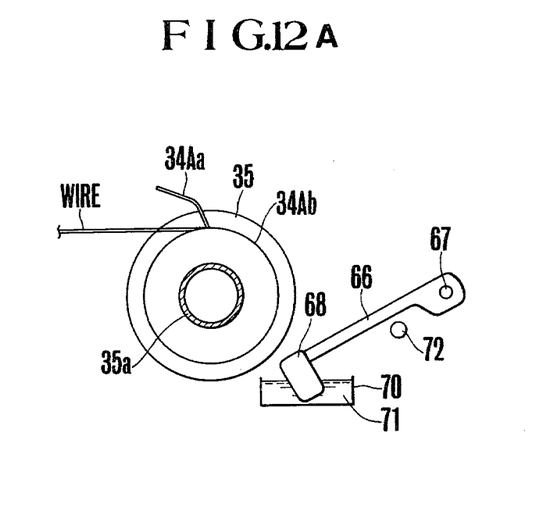
Figure 12B:
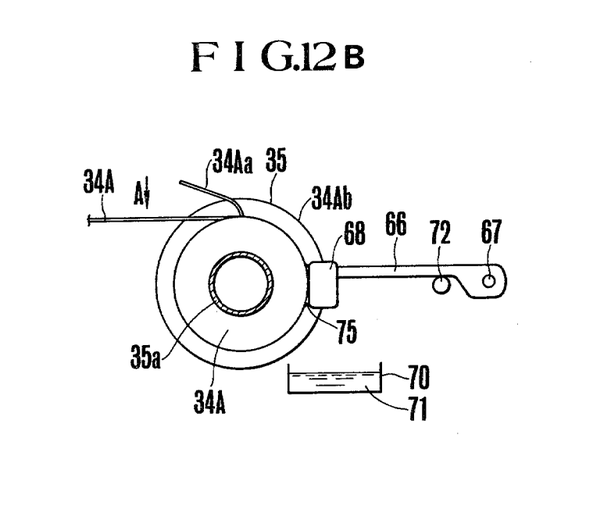

This construction will now be described in more detail. Generally, the coil 34 wound on the bobbin 35 comprises an exciting coil 34A made of a relatively thick insulated wire (for example about 0.8 mm diameter) and a detecting coil 34B made of a relatively thin insulated wire (for example about 0.2 mm diameter). As shown in FIG. 11, these coils are connected with a transistor 39, a power source 65, and a resistor 38 to form an oscillation circuit. These coils are formed as follows. The thick wire is wound several turns about the core 35a of the bobbin 35 mounted on a coil winding machine, and the beginning end 34Aa is led out. Then the bobbin 35 is rotated a predetermined number of revolutions by the coil winding machine to form the exciting coil 34A. This stage is shown by FIG. 12A. A lever 66 is rotatably mounted on a shaft 67 and a sponge 68 acting as a liquid absorber is mounted on the free end of the lever 66. Normally, the sponge 68 is immersed in a hot melt binder 71 contained in a container 70. As is well known in the art, the hot melt binder 71 consists essentially of a polyamide resin which is difficult to burn, and has excellent heat resistant property and electric insulating property. Although it is solid at room temperature, it softens at about 185° C., and becomes liquid at 200° C. with a viscosity of 4,000 to 10,000 centipoise. The container 70 is heated to a temperature above 200° C. by an electric heater (not shown) so that the hot melt binder 71 becomes liquid and will impregnate into the sponge 68. A drive pin 72 is provided for upwardly rotating the lever 66. After forming the exciting coil 34A by wrapping the thick wire a predetermined number of turns, the lever 66 is rotated to the horizontal position by the drive pin 72. At this time, the sponge 68 engages the surface of the exciting coil 34A across its width to apply the hot melt binder 71, which has been impregnated into the sponge, on the engaged surface, as shown in FIG. 12B. As the drive pin 72 descends to disengage the sponge 68 from the surface of the exciting coil the applied layer of the hot melt binder solidifies due to rapid temperature decrease whereby the end portion 34Ab of the wire is fastened to the surface of the exciting coil 34A. Thereafter, the wire is severed at a position shown by arrow A in FIG. 12B and the end 34Ab of the wire is lead out thus completing the winding operation of the exciting coil 34A.

Figure 12C:
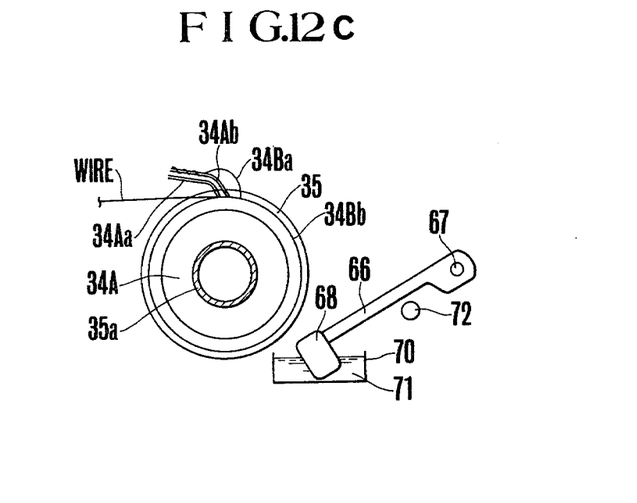
Figure 12D:
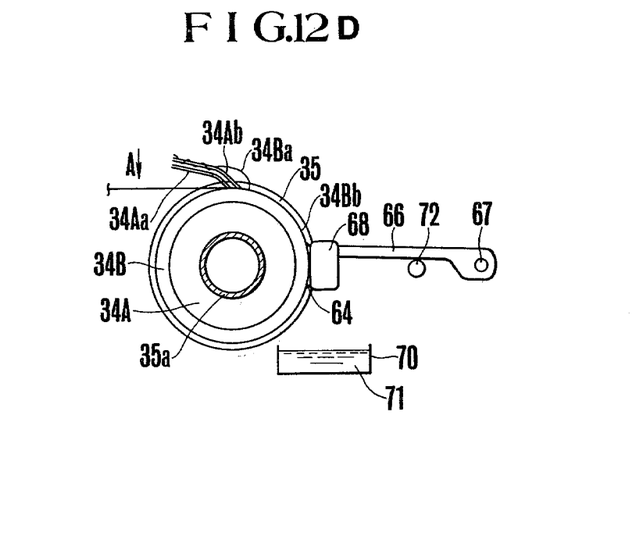

Then, a thin wire is wrapped about the exciting coil 34A two or three turns and the winding starting portion of the wire 34Ba is led out and wrapped about the end portion 34Ab. Thereafter, the bobbin 35 is rotated a predetermined number of revolutions by the coil winding machine to form the detecting coil 34B, as shown by FIG. 12c. At this time, the drive pin 72 is operated again to rotate lever 66 to a substantially horizontal position so as to cause the sponge 68 impregnated with the liquid hot melt binder 71 to contact the entire width of the surface of the detecting coil 34B to apply the hot melt binder 71 to the contacted portion. Since the outer diameter of the detecting coil is larger than that of the exciting coil, when the lever 66 is rotated upward, the sponge 68 will contact the lower portion of the surface of the detecting coil 34B. However, since the pivot shaft 67 is constructed to retract (toward the right), the lever 66 can rise while maintained in the horizontal state, as shown in FIG. 12b. As the drive pin 72 descends and the sponge 68 disengages from the detecting coil 34B, the applied layer of the hot melt binder 64 rapidly solidifies thus fastening the end of the wire 34Bb to the surface of the detecting coil 34B. At this time, the wire is severed at a position shown by arrow A in FIG. 12D to pull out the end of the wire thus completing the detecting coil 34B. When the lever 66 is removed away from the surface of the detecting coil 34B, the pivot shaft 67 returns to the original position. The completed electromagnetic coil 34 is shown in FIG. 10.

Since the end portion 34Bb of the wire is secured to the detecting coil 34B by the hot melt binder 64, the completed detecting coil 34B will not unravel. As above described, since the ends of respective coils are automatically fastened by the operation of the lever 66, labor can be saved.

While in the foregoing embodiment, the coil bobbin was rotated to wind the wire, it is also possible to held stationary the bobbin and to rotate the wire about the bobbin by a guide lever. In the latter case, after completing the exciting coil, the detecting coil is wound thereon without severing the wire. Then, the end of the detecting coil is fixed and the wire between the coils is severed.

While in the foregoing description, two coils were overlapped, the method of winding the coil is also applicable to a single layer coil or a multilayer coil.

As above described, according to this invention it is possible to automatically fasten the coil end with a hot melt binder thus simplifying the winding operation.

What is claimed is:

1. In an electromagnetic pump of the type comprising a nonmagnetic sleeve, a plunger slidably contained in the sleeve, inlet valve means and outlet valve means coupled to said plunger, an inlet fixture and an outlet fixture disposed on the opposite ends of said sleeves, an exciting coil surrounding a portion of said sleeve between said inlet and outlet fixtures, means for passing pulsating current through said exciting coil for reciprocating said plunger, and a return spring acting on said plunger thereby pumping liquid by the reciprocating motion of said plunger in cooperation with said inlet valve means and said outlet valve means, the improvement which comprises a generally U shaped yoke member made up of a pair of spaced parallel legs and a separate connecting plate for interconnecting one end of said pair of legs, a generally U shaped housing member combined with said yoke member so as to define a closed space adapted to substantially contain said exciting coil, said means for passing pulsating current, said plunger and said sleeve, and means for fastening together said combined yoke member and said housing member, said pair of legs being provided with openings for securing said inlet fixture and said outlet fixture, respectively.

2. The electromagnetic pump according to claim 1 wherein the side edges of said connecting plate are provided with outwardly projecting flanges for mounting said electromagnetic pump in situ.

3. The electromagnetic pump according to claim 1 which further comprises an oscillator assembly disposed between said pair of legs, an insulating coating applied on the outer surface of said oscillator assembly, and a foamed member filling a space defined by said yoke member and said housing member.

4. The electromagnetic pump according to claim 1 wherein an end portion of a wire of said exciting coil is fastened to said coil by a hot melt binder.

5. The electromagnetic pump according to claim 1 wherein at least one of said inlet and outlet fixtures is secured to the opening of said leg by caulking.

6. In an electromagnetic pump of the type comprising a nonmagnetic sleeve, a plunger slidably contained in the sleeve, inlet valve means and outlet valve means coupled to said plunger, an inlet fixture and an outlet fixture disposed on the opposite ends of said sleeve, an exciting coil surrounding a portion of said sleeve between said inlet and outlet fixtures, means for passing pulsating current through said exciting coil for reciprocating said plunger, and a return spring acting on said plunger thereby pumping liquid by the reciprocating motion of said plunger in cooperation with said inlet valve means and said outlet valve means, the improvment which comprises a generally U shaped yoke member made up of a pair of spaced parallel legs and a connecting plate for interconnecting one end of said pair of legs, a generally U shaped housing member combined with said yoke member so as to define a closed space adapted to substantially contain said exciting coil, said means for passing pulsating current, said plunger and said sleeve, and means for fastening together said combined yoke member and said housing member, said pair of legs being provided with openings for securing said inlet fixture and said outlet fixture respectively, said legs being further provided with notches, said pump further comprising a printed substrate carrying electronic elements including a transistor which constitute an oscillator for supplying pulsating current to said exciting coil, said printed substrate being received in said notches of said legs, and wherein said housing member is provided with a plurality of projections engaging said notches of said legs for securing said housing member to said yoke member.

7. The electromagnetic pump according to claim 6 wherein said printed substrate includes a heat radiating metal plate on which said transistor is mounted and said metal plate engages at least one of said projections.

* * * * *

UNITED STATES PATENT AND TRADEMARK OFFICE
CERTIFICATE OF CORRECTION

PATENT NO. : 4,306,842

DATED : December 22, 1981

INVENTOR(S) : Mitusuke Masaka, Kawagoe, Japan

It is certified that error appears in the above—identified patent and that said Letters Patent is hereby corrected as shown below:

In column 1, line 51, change "improved" to --improve--

In column 10, line 51, change "held" to --hold--.

Signed and Sealed this

Sixth Day of April 1982

[SEAL]

Attest:

Attesting Officer

GERALD J. MOSSINGHOFF

Commissioner of Patents and Trademarks